(12) United States Patent
Kumar et al.

(10) Patent No.: US 10,209,695 B2
(45) Date of Patent: Feb. 19, 2019

(54) METHOD AND A SYSTEM FOR REPLACING AND COMMISSIONING OF A FIELD DEVICE

(71) Applicant: ABB Schweiz AG, Baden (CH)

(72) Inventors: Ravish Kumar, Bangalore (IN); Deepaknath Tandur, Bangalore (IN); Mallikarjun Kande, Bangalore (IN); Roland Braun, Lulsdorf (DE); Bhangale Milind, Jalgaon (IN); Neil Shah, Ahmedabad (IN); Stefan Bollmeyer, Minden (DE); Shashishekhar Pandharkar, Bangalore (IN)

(73) Assignee: ABB Schweiz AG, Baden (CH)

( * ) Notice: Subject to any disclaimer, the term of this patent is extended or adjusted under 35 U.S.C. 154(b) by 76 days.

(21) Appl. No.: 15/038,000

(22) PCT Filed: Nov. 17, 2014

(86) PCT No.: PCT/IB2014/066088
§ 371 (c)(1),
(2) Date: May 19, 2016

(87) PCT Pub. No.: WO2015/075615
PCT Pub. Date: May 28, 2015

(65) Prior Publication Data
US 2016/0291563 A1    Oct. 6, 2016

(30) Foreign Application Priority Data

Nov. 22, 2013 (IN) .............................. 5389/CHE/2013
Nov. 13, 2014 (IN) .............................. 5715/CHE/2014

(51) Int. Cl.
G05B 19/048 (2006.01)
H04L 12/24 (2006.01)
H04L 29/08 (2006.01)

(52) U.S. Cl.
CPC ........ G05B 19/048 (2013.01); H04L 41/0883 (2013.01); H04L 67/125 (2013.01);
(Continued)

(58) Field of Classification Search
CPC ............................................ G05B 2219/25428
See application file for complete search history.

(56) References Cited

U.S. PATENT DOCUMENTS 9,699,270 B2 * 7/2017 Kande ..................... H04W 4/70
9,830,216 B2 * 11/2017 Nguyen .............. G06F 11/0793
(Continued)

FOREIGN PATENT DOCUMENTS

EP    2523059 A2    11/2012
WO    2007121141 A2    10/2007
WO    2007121218 A2    10/2007

OTHER PUBLICATIONS

International Search Report, PCT/IB2014/066088, ABB Technology Ltd., dated Apr. 1, 2015, 3 pages.
(Continued)

Primary Examiner — Benjamin Sandvik
(74) Attorney, Agent, or Firm — Barnes & Thornburg LLP

(57) ABSTRACT

In aspects, the present invention discloses a method for replacing a first field device with a second field device using a commissioning tool. The method comprising retrieving a device description file associated with the first field device, analyzing the device description file, generating a first object by mapping a parameters of the second field device to a parameter from the identified one or more parameters based
(Continued)

on a first index and a second index, generating a configuration file associated with the second file device based on the device description file and the generated first object, and transmitting the configuration file to the second field device for commissioning operation of the second field device. The step of analyzing the device description file comprises identifying one or more parameters from the plurality of parameters for mapping based on a predetermined criteria.

12 Claims, 3 Drawing Sheets

(52) U.S. Cl.
CPC ............ *H04L 67/303* (2013.01); *H04L 67/34* (2013.01); *G05B 2219/24072* (2013.01)

(56) References Cited

U.S. PATENT DOCUMENTS

| | | | |
|---|---|---|---|
| 2007/0250180 A1 | 10/2007 | Bump et al. | |
| 2009/0228611 A1 | 9/2009 | Ferguson et al. | |
| 2010/0228373 A1* | 9/2010 | Lucas .............. | G05B 19/41845 700/108 |
| 2012/0303144 A1* | 11/2012 | Grossmann ........ | G05B 19/0426 700/90 |

OTHER PUBLICATIONS

Written Opinion, PCT/IB2014/066088, ABB Technology Ltd., dated Apr. 1, 2015, 4 pages.

\* cited by examiner

METHOD AND A SYSTEM FOR REPLACING AND COMMISSIONING OF A FIELD DEVICE

CROSS-REFERENCE TO RELATED APPLICATIONS

This application is a U.S. national stage of International Application Ser. No. PCT/IB2014/066088, filed Nov. 17, 2014, which claims priority to Indian Patent Application No. 5715/CHE/2014, filed Nov. 13, 2014, and to Indian Patent Application No. 5389/CHE/2013, filed Nov. 22, 2013.

FIELD OF INVENTION

The present invention relates to the field of field devices and process automation, and more specifically to replacement and commissioning of field devices.

BACKGROUND

In the field of process automation, a field device is replaced during maintenance in case of faulty device or during up gradation of the plant. Generally for replacing and commissioning of field devices involves steps such as creating a copy of the configuration of the field device to be replaced, replacing the previous field device with new field device, manually creating a configuration file for the new field device in case the device versions or manufactures are different, and transferring of the copy of the configuration of the previous field device into the new or replaced field device.

The method for replacing and commissioning of the said field device with the same type, same revision and from the same manufacturer's field device is simple as old device configuration file is reusable in the same form However, if the new or replaced field device is of a different revision and/or from a different manufacturer, the configuring of the said new or replaced field device with the said copy of the configuration of the previous field device becomes very complex.

For simplicity in replacing and (commissioning of field devices from a different manufacturer and/or of a different revision, generic software components such as the "Generic Highway Addressable Remote Transducer (HART) DTM" are used in the device management component of Distributed Control System (DCS) in accordance with present state of art. However only limited accessibility to the functionalities of the field devices are provided by using generic components. For instance, in case of HART protocol based device, only the universal and common practice commands associated with the field devices are executed by using generic components.

There have been several approaches which have attempted to solve the problems mentioned above. However, there is a need for an improved system and method and a system for replacing and commissioning of field devices that allows seamless reusability of field device configuration files, interoperability.

SUMMARY OF THE INVENTION

The above-mentioned shortcomings, disadvantages and problems are addressed herein which will be understood by reading and understanding the following specification.

The proprietary implementing of device specific commands and variables within a device description language (DDL) file or software components (e.g. Device Type Manager, DTM) are usually different form vendor to vendor. Present invention proposes a method such that the said proprietary variables are reusable between the field devices from different manufacturers and/or of different revision. Hence a hassle free solution for replacing and commissioning of field devices from different manufactures and/or of different type is provided by the present invention.

In an aspect, the present invention discloses a method for replacing a first field device with a second field device. The method comprises retrieving a device description file associated with the first field device, analyzing the device description file, identifying one or more parameters from the plurality of parameters for mapping based on a predetermined criteria, generating a first object by mapping a parameters of the second field device to a parameter from the identified one or more parameters based on a first index and a second index, generating a configuration file associated with the second file device based on the device description file and the generated first object, and transmitting the configuration file to the second field device for commissioning operation of the second field device.

The first index is determined based on semantic similarity between a name of the parameter of the second field device and a name of the parameter from the identified one or more parameters using a semantic dictionary. The second index is determined based by comparing comparison of parameter data type, parameter class, related command, and parameter identity number of the parameter of the second field device with parameter data type, parameter class, related command, and parameter identity number of the parameter from the identified one or more parameters.

In an embodiment, analyzing the device description file further comprises extracting a plurality of commands and a plurality of parameters from the device description file associated with the first field device and identifying one or more relationships between the plurality of commands and the plurality of parameters. In an embodiment, analyzing the device description file further comprises identifying one or more parameters to be configured by a user, using a lookup table.

In an embodiment, the method further comprises requesting a confirmation from a user upon mapping the parameter of the second field device to the parameter from the identified one or more parameters, and modifying the semantic dictionary upon receiving confirmation from the user.

In another aspect, the present invention discloses a configuration tool for replacing a first field device with a second field device. The commissioning tool includes one or more processors, a network interface, and a memory module. The network interface configured to receive a device description file associated with the first field device, and transmit a configuration file to the second field device for commissioning operation of the second field device. The memory module is operatively coupled to the one or more processors, and comprises a semantic dictionary. The one or more processors configured to analyze the device description file, generate a first object by mapping a parameters of the second field device to a parameter from the identified one or more parameters based on a first index and an second index, and generate the configuration file associated with the second file device based on the device description file and the generated first object. While analyzing the device description file, the one or more processors identify one or more parameters from the plurality of parameters for mapping based on a predetermined criteria. The first index is determined using the semantic dictionary.

In an embodiment, the one or more processors are further configured to request a confirmation from a user upon mapping the parameter of the second field device to the parameter from the identified one or more parameters, and modify the semantic dictionary upon receiving confirmation from the user.

Systems and methods of varying scope are described herein. In addition to the aspects and advantages described in this summary, further aspects and advantages will become apparent by reference to the drawings and with reference to the detailed description that follows.

DETAILED DESCRIPTION OF THE INVENTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
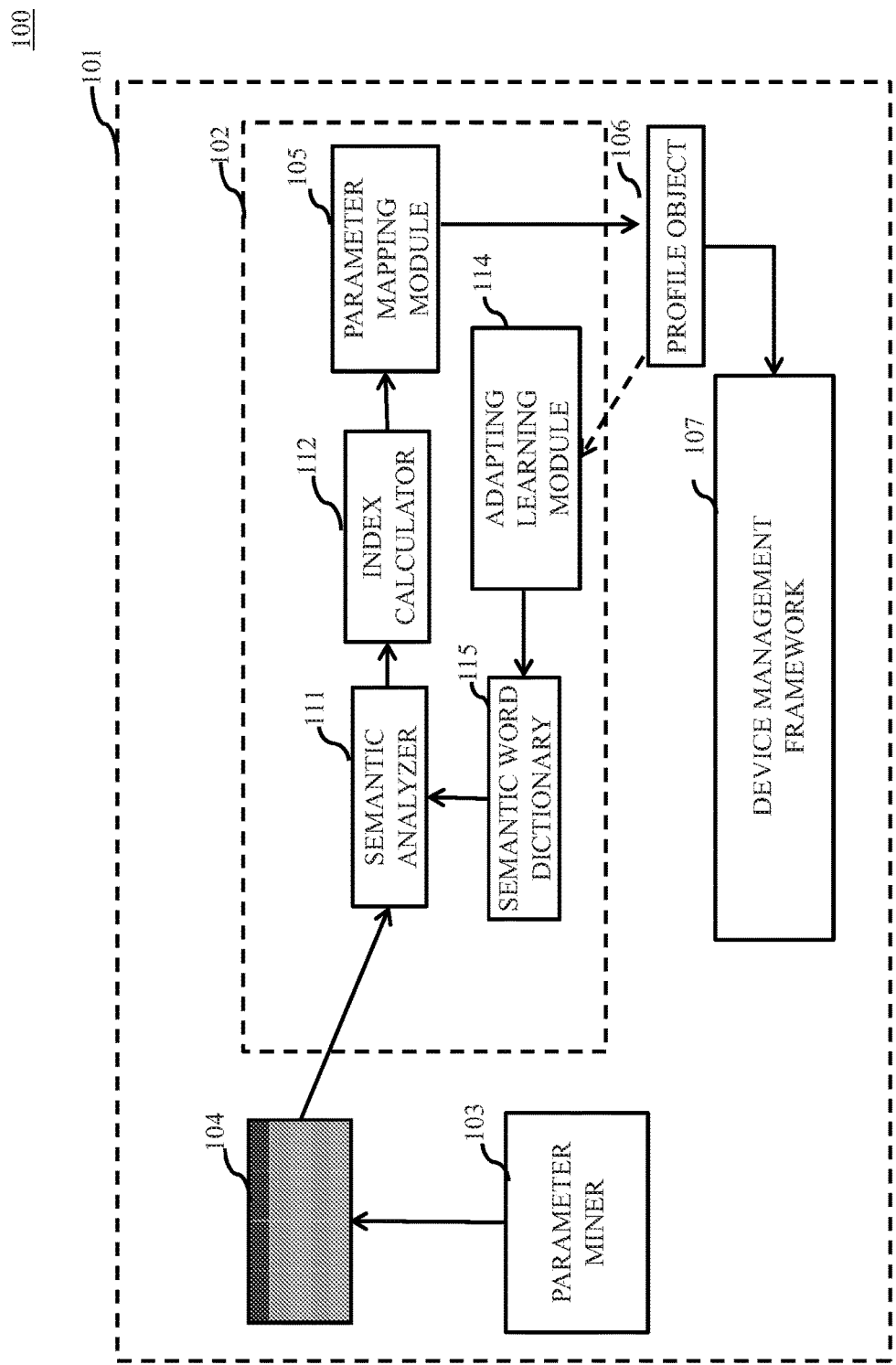
FIG. 1 illustrates a system for replacing and commissioning a field device; in accordance with various embodiments of the present invention.

The invention is described herein further with reference to a non-exhaustive exemplary embodiment and with reference to FIG. 1.

In FIG. 1, a system 100 for replacing and commissioning of a field device is shown, in accordance with various embodiments of the present invention. An industrial system comprises a replacement field device (also referred to as second field device) that replaces an existing field device (also referred to as first field device. The industrial system comprises a configuration tool provided for obtaining information of commands and parameters related to a field device. This can be done through parameter miner (103) by mining the device description file. The information so obtained are collated or consolidated in a tabular data structure (104). The tabular data structure includes but not limited to parameter name, help string, associated command, data type, variable size, etc.

The configuration tool (101) comprises a profile generation tool (102). The profile generation tool (102) includes a parameter mapping module (105) which performs mapping of the information collated in the tabular data structure (104) with the information of the other device, to generate a profile object (106) (also referred as a first object). Here, the mapping is performed subsequent to the operations of a semantic analyzer (111) and index calculator (112). The semantic analyzer (111) and index calculator (112) perform semantic analysis and determine first and second index using the name, help text, label text and associated commands information of the parameters. Based on first index value and second index, parameters of the second filed device are mapped to parameters of the first field device by parameter mapping module (105). The adaptive learning module (114) and semantic word directory (115) analyze the profile object and help in improving the semantic analyzer (111). The unmapped universal variables are either set to default value or being manually set by a user based on the criticality of the parameters. The configuration determines the criticality of the parameters by looking up and comparing the parameter names against a look up table having a list of key parameter names. This is further explained in the description of FIG. 2. While the FIG. 1 provides a logical diagram for the commissioning tool, the commissioning tool is a hardware component embedded on the second field device or the control system and includes one or more processors, a network interface and a memory module.

Figure 2:
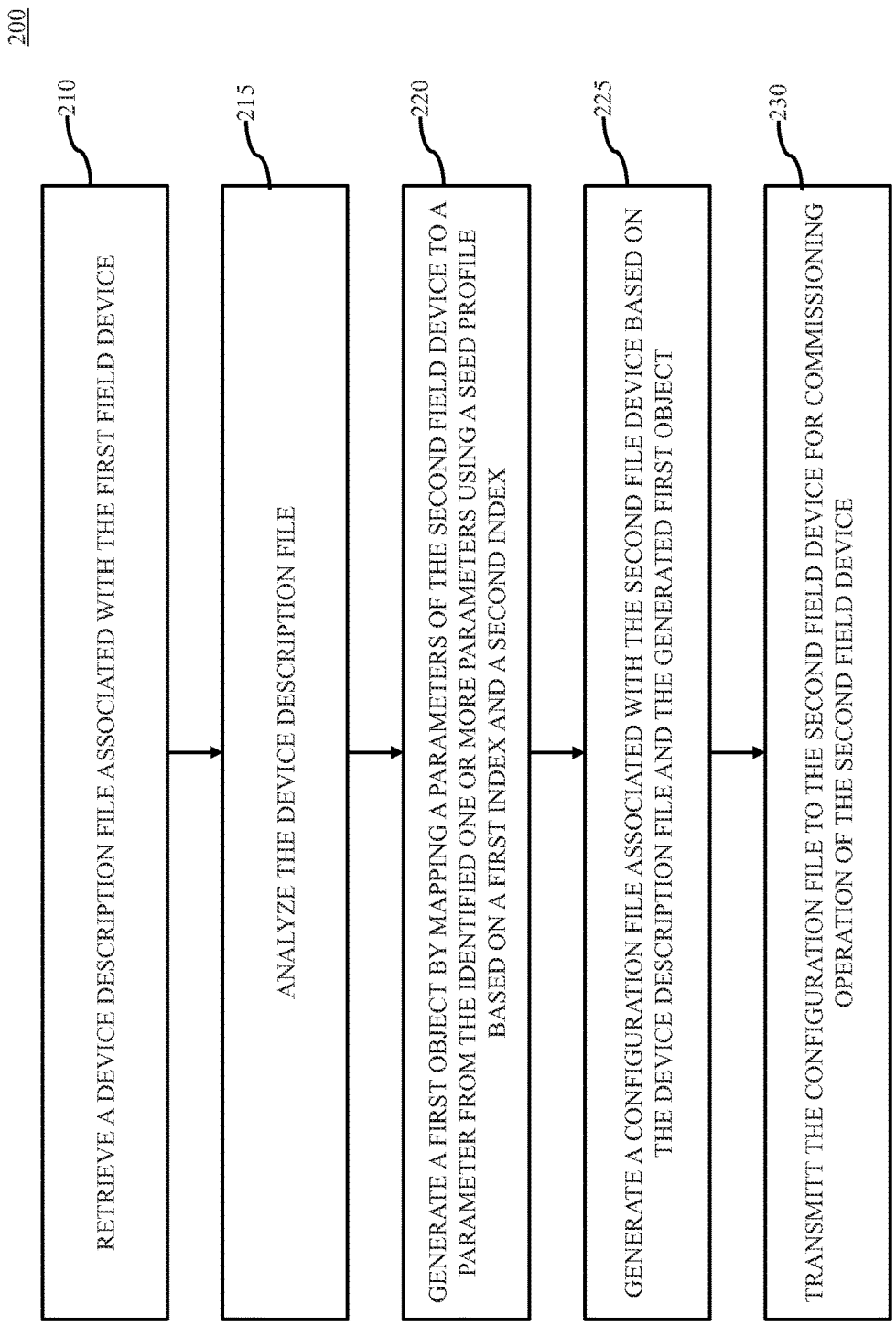
FIG. 2 illustrates a method for replacing and commissioning a field device, in accordance with various embodiments of the present invention.

FIG. 2 illustrates a method (200) for replacing and commissioning a field device, in accordance with various embodiments of the present invention. At step 210, the commissioning tool, particularly the parameter miner (103) retrieves the device description file associated with the first field device. Device definition (DD) file describes the field device's operational parameters (also referred to as parameters), support commands and machine logic. Parameters hold the device properties such as primary value, damping value etc. These properties are downloaded or uploaded to the device using HART commands Therefore parameters are associated with commands In the device description file, various operational parameters and commands associated with the functioning of the first field device, is defined. Particularly, the attributes of the operational parameters and the commands are defined. Attributes includes data type, name, help string, default value, and the like.

At step 215, the commissioning tool analyzes the device description file. The commissioning tool extracts the information relating to parameters and the commands and stores the information in a tabular format. Then, the commissioning tool identifies one or more relationships between the commands and the parameters. The commissioning tool determines a relationship exists between a particular parameter and a particular command if the particular parameter is mentioned in command definition section associated with the particular command in the device description file, or if the particular command is modified by the particular command Then, the commissioning tool identifies one or more parameters from the plurality of parameters for mapping based on a predetermined criteria.

The commissioning tool uses the attributes of the parameters and the one or more relationships to identify the one or more parameters for mapping. For example, in an embodiment, the commissioning tool can identify the one or more parameters for mapping on the basis of parameter handling type. In the device description file there are two types of parameters on the basis of parameter handling type: write enabled parameters which are to be configured during commissioning and write disabled parameters which cannot be configured. The commissioning tool will identify write enable parameters as one or more parameters for mapping.

Figure 3:
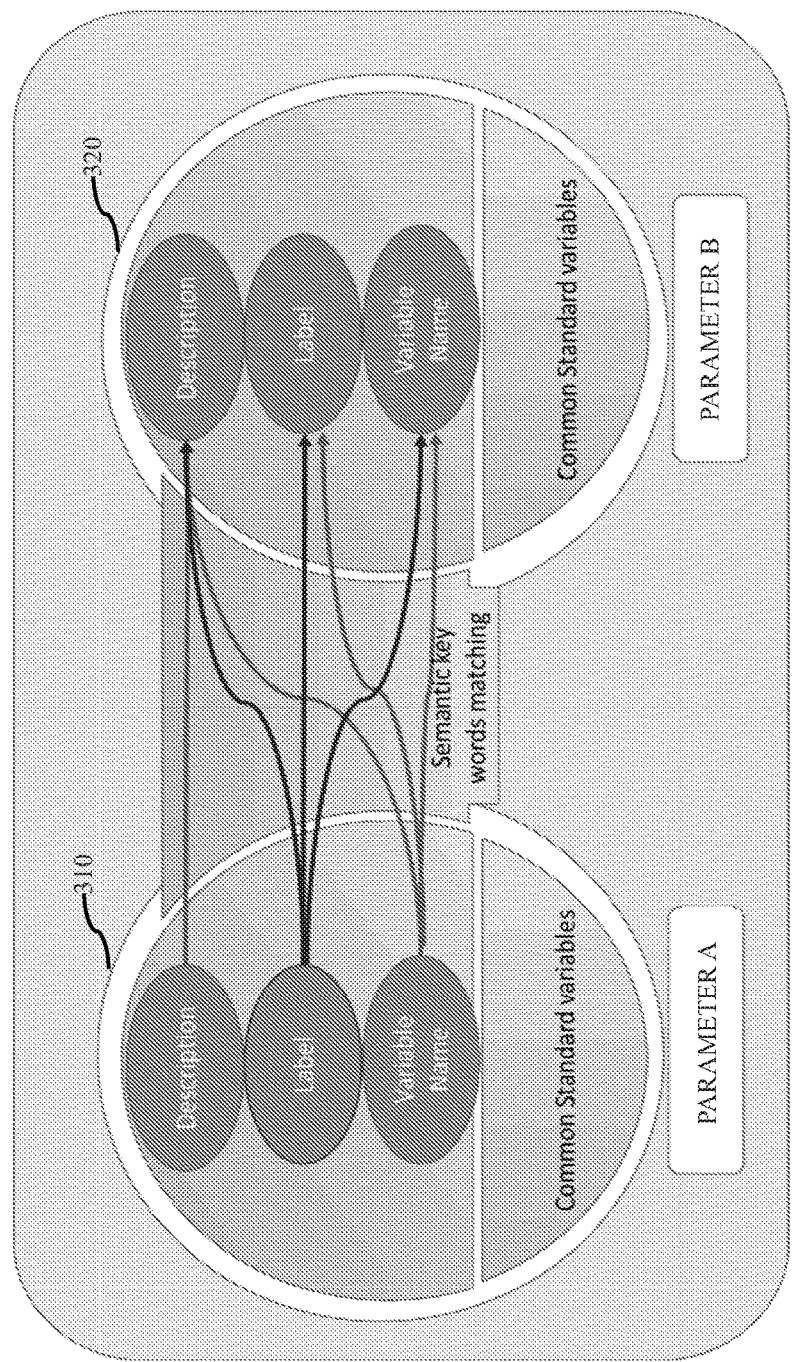
FIG. 3 exemplarily illustrates sematic matching of one or more attributes of a parameter A with one or more attributes of parameter B.

At step 220 the commissioning tool will generate a first object (also referred to as profile object). The sub steps of step 220 are explained herein. At the first sub step, the commissioning tool determines a first index based on semantic similarity between one or more attributes of a parameter of the second field device and one or more attributes of a parameter from the identified one or more parameters using a semantic dictionary. To determine the first index, the commissioning tool performs semantic matching between the various attributes of parameter of the second field device and the various attributes of the parameter from the identified one or more parameters of the first field device and determines one or more similarity scores based on the semantic matching. This is further illustrated in FIG. 3. Sematic matching and similarity score calculation is done by considering reduced and full form of the attribute value using methods and techniques well known in the art.

Based on the semantic similarity among the attributes of the parameter of the second device and the mapped parameter of the first device, the commissioning tool calculates or determines the first index. For example, the first index from semantic matching of the parameter of the second field device having: a name attribute ($N_1$) having value "Pressure Value" and a label attribute ($L_1$) having value "stores pressure value", and the mapped parameter from the first field device having: a name attribute ($N_2$) having value "PresVal" and a label attribute ($L_2$) having value "contains the pressure value as measured" would be $$\text{First Index} = [K_1*(N_1N_2)] + [K_2*(L_1L_2)] + [K_3*(L_1N_2)] + [K_4*(N_1L_2)]$$

Where $K_1$, $K_2$, $K_3$, $K_4$ are constants set during configuration of the commissioning tool $N_1N_2$ is the similarity score calculated by semantic matching of the name attributes $L_1L_2$ is the similarity score calculated by semantic matching of label attributes $L_1N_2$ is the similarity score calculated by semantic matching of label attribute $L_1$ and name attribute $N_2$ $N_1L_2$ is the similarity score calculated by semantic matching of label attribute $N_1$ and name attribute $L_2$.

Then, at the second sub step, the commissioning tool determines a second index by comparing one or more functional attributes of the parameter of the second field device with one or more functional attributes of the parameter from the identified one or more parameters of the first field device. Functional attributes are attributes which define the functional aspects of the parameter. In an example, specific to HART based devices, functional attributes includes, but is not limited to, parameter data type, parameter class, related command, and parameter identity number. The commissioning tool determines the second index based on the equality or equivalent between the functional attributes of the parameter of the second field device and the mapped parameter of the first field device. In an example, the parameter of the second field device has the functional attributes: data type: INT (D1) and related command: GetProcessData (C1), and the mapped parameter of the first field device has the functional attribute: data type: FLOAT (D2) and command: GetMeasurementData (C2). In the example, the second index will be $$\text{Second Index} = [O1*(D1D2)] + [O2*(C1C2)]$$

Where

O1, O2, are constants set during configuration of the commissioning tool

D1D2 is the similarity score calculated by comparing the range and data storage format of data types attributes C1C2 is the similarity score calculated by comparing command definition of the related command attributes.

Subsequent to second sub step, at the third sub step, the commissioning tool maps the parameters of the second field device to the parameter from the identified one or more parameters based on a seed profile, the first index and the second index. When the calculated first index and the calculated second index are both above a predetermined score or when the mapping information is provided in the seed profile, then the parameter of the second field device is mapped to the mapped parameter of the first field device. In an embodiment, the commissioning tool provides a list of parameters which were not mapped to the user for manual mapping. According to the inputs from the user, the commissioning performs the mapping and modifies the seed profile to include the information provided by the user. Additionally, the commissioning tool learns from users input to create and modify a knowledge database called semantic dictionary. The semantic dictionary is used during variables semantic analysis. There is no standard guideline exist which guides how to define attributes like name, description and label have to be written, thereby giving liberty for developer while these attributes. Some developer can use abbreviated name, some can use full name, or some can use synonyms. Same family devices (ex: pressure device family) from different vendors must have common mandatory parameters set which are required to plant process. These mandatory parameter would not have the same name, description or label but they holds the similar property. The adaptive learning commissioning tool takes the parameter mapping data provided by the user to create new entry in semantic directory.

At step 230, the commissioning tool generates a configuration file associated with the second field device based on the device description file and the generated first object. At step 240, the commissioning tool transmits the configuration file to the second field device for commissioning the operation of the second field device.

In an embodiment, the seed profile includes one or more associations between HART specified parameters and parameters of the first field device. Seed profile contains command and associated parameters mapping details of two or multiple vendor's field devices. Seed profile is reusable among multiple field devices of different vendors those commands and variables are mapped in the seed profile. There are two types of seed profiles are defined as Generic seed profile and vendor's specific seed profile. Generic seed profile contains generic device parameters and command mapping with vendor specific parameters and commands Generic device parameters are those parameters which are defined in generic device description file such as HART Generic device description file. Generic seed profile is used for mapping generic device description parameters and device specific parameters. "Vendor seed profile" contains vendor specific device parameters and command mapping with another vendor's device parameters and commands. One seed profile is reusable among different variants of same device type parameters mapping. Vendor specific seed profile generation need user's input to map commands and variables of two different vendors. It is done with the help of seed profile generation tool wizard. This tool has automatic semantic recognition intelligence which will help user to map commands and variables. In case of data type mismatch, the seed profile also keeps details of data type conversion.

In an embodiment, analyzing the device description file further comprises extracting a plurality of commands and a plurality of parameters from the device description file associated with the first field device and identifying one or more relationships between the plurality of commands and the plurality of parameters. The plurality of commands includes one or more universal commands In an embodiment, analyzing the device description file further comprises identifying one or more parameters to be configured by a user, using a lookup table. These parameters would be essential parameters to be configured by the user. To simplify the device parameter configuration process, the commissioning tool categorizes the device parameters based on industrial application dependency and only those parameters are offered to commissioning engineer which are very essential to configure to execute the industrial application. The remaining parameters can be hided from commissioning engineer.

Essential parameters are application specific. For different types of application different essentials parameters may require to configure. Typically, the list of essential parameters is recommended by team of experts, customers or regulatory bodies. Non-uniform designation/name of the device parameters with large number of parameters makes difficult to identify essentials application specific parameters. If the field device is, for example, a temperature sensor, the essential parameter "TemperatureValue" can be designated differently depending on the manufacture and can be called "TempVal", "TVal", "PV" or the like, since the designation is not standardized industrially.

For the automatic identification of essential parameters among non-uniform designation/name of device parameters generation, the Device Description file of Field device is used. In order to find essential parameter in the device the combination of command details along with byte position can be used to find essential parameters of device. For example "Tag Name" HART command #13, byte [0-5] refers Tag value. Respectively HART command #1, #36, #37, #34 and #47 can be used for identifying Primary value, Upper-Range Value, Lower-Range Value, Damping value and Transfer function. In an embodiment, the commissioning tool includes a list of essential parameters provided by experts and performs semantic analysis In an embodiment, the configuration tool (101) includes a device management framework (107). The profile object (106) so generated is imported into the device management framework (107) which is connected to a Field Device Integration (FDI) platform (not shown in FIG. 1) over a control network. The FDI platform has information about the field devices, device parameters and their association with other field devices or device parameters thereof. All the information related to field devices is stored in objects within the information model. The attributes of the object represent the device properties and its dependencies thereof.

In an embodiment, an attribute termed as "Alias" is created and employed herein for device replacement within the FDI platform. The object types of Alias are created by importing the profile object in the FDI platform. The Alias attribute can be created at any device object of the information model. One device object of the information model can have one or more Alias attributes of different types. Alias object also performs automatic data type conversion between mapped multiple field device parameters.

Considering replacement of device A with device B employing Alias object, the invention is further described as an exemplary embodiment. An instance of Alias object type is created as an attribute for device A. The Alias object type can be selected from Alias directory. Each Alias object consists of the mapping details pertaining from one device to another device. While creating the instance of Alias object type, a virtual configuration for the device is created for the mapped device B based on device A configuration. Virtual configuration handles the data type conversion between device A and device B parameters.

Upon creation of Alias attribute, the field device A is replaced with field device B. The device B requires the parameter configuration similar to that of device A. In relation to this, the virtual configuration created by the Alias object is downloaded or imported (111) directly into device B eliminating further or additional steps. The end-user applications which were previously associated with device A, does not require remapping, as the communications to device A are re-routed through the Alias object mapped to device B.

Additionally, the present invention discloses a method for easy comparison of parameters from two different devices. The method uses the commissioning tool for comparing two field device parameters when devices measuring same physical parameter are from different vendors and vendors has given give different names to parameters with same meaning. Below a typical embodiment of the method is provided.

The tool functionality will allow user to select two or more devices, and once more than two devices are selected compare button gets enabled and on pressing button, a grid as shown attachment is populated which will contain parameters from different devices (Either of same make or different make) The differences will be highlighted so that they can be easily identified. Major steps involved in this comparison process are below; step 1:—As first step tool will check in background, whether selected devices are of same type or not. In case they are not of same type then will provide feedback to user with needed actions. Step 2:—In case if two or more devices selected for comparison are from same vendors and vendor has maintained same names for parameters representing same physical parameter across devices then the commissioning tool will match names and arrange parameters in same row or at least close to each other if matched to certain extent. One of the inputs to tool will include a database, with common names of parameters used. Step 3:—Once device parameter compare tool finishes matching by names then the commissioning tool will perform semantic profiling to refine parameter matching further. Step 4:—Further the commissioning tool will make use of various techniques for example looking at UID to learn logically grouped parameters and extrapolating relationships if one more parameter names in group are direct match. Or using relationship constructs in EDD to identify matching parameters. Step 5:—Finally tool will populate a list after which the user will have the option to arrange parameters by his own in case user notices some inconsistencies in matched parameters. Such user actions will be tracked and will generate learning for future comparisons. Outcome of such learning will be fed to seed profile or semantic dictionary to create unique additional key for parameters as identical designation. Step 7:—Once complete list is populated user will have option to export such list. Drag and drop single or multiple parameter values from one device to another device. Upon changes in value user can download such changed values to device directly from same compare list. This will avoid need of switching to other UI for starting download operation thus saving time. Step 8:—While downloading tool will exclude parameters related to communication (e.g. polling address or long tag). In addition select all parameters option shall be provided to copy all parameters from one device to other.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for replacing a first field device with a second field device in a plant, using a commissioning tool of a control system in the plant, the commissioning tool comprising one or more processors, a network interface, and a memory module, the method comprising:
   retrieving, by the commissioning tool, a device description file associated with the first field device, the device description file comprising a plurality of parameters;
   analyzing the device description file, by the commissioning tool, wherein analyzing the device description file comprises identifying one or more parameters from the plurality of parameters for mapping based on a predetermined criteria;
   generating, by the commissioning tool, a first object, wherein generating comprises:
      calculating a first index based on semantic similarity between one or more attributes of a parameter of the second field device and one or more attributes of a parameter from the identified one or more parameters of the first field device using a semantic dictionary,
      calculating a second index by comparing one or more attributes of the parameter of the second field device with one or more attributes of the parameter from the identified one or more parameters of the first field device, and
      mapping the parameter of the second field device to the parameter from the identified one or more parameters based on at least one of a seed profile, the first index, and the second index;
   generating, by the commissioning tool, a configuration file associated with the second file device based on the device description file and the generated first object; and
   transmitting the configuration file, by the commissioning tool, to the second field device for commissioning operation of the second field device in accordance with the configuration file.

2. The method as claimed in claim 1, wherein the seed profile includes one or more associations between Highway Addressable Remote Transducer (HART) specified parameters and parameters of the first field device.

3. The method as claimed in claim 1, wherein analyzing the device description file further comprises:
   extracting a plurality of commands and a plurality of parameters from the device description file associated with the first field device, wherein the plurality of commands includes one or more universal commands; and
   identifying one or more relationships between the plurality of commands and the plurality of parameters.

4. The method as claimed in claim 1, wherein analyzing the device description file further comprises identifying one or more parameters to be configured by a user, using corresponding Highway Addressable Remote Transducer (HART) command number and byte position and a lookup table.

5. The method as claimed in claim 1, further comprising:
   requesting a confirmation from a user upon mapping the parameter of the second field device to the parameter from the identified one or more parameters; and
   modifying the semantic dictionary upon receiving confirmation from the user.

6. The method as claimed in claim 1, further comprising commissioning the second field device in accordance with the configuration file.

7. The method as claimed in claim 1, wherein the commissioning of the second field device in accordance with the configuration file is performed by the commissioning tool.

8. The method as claimed in claim 3, wherein comparing the one or more attributes of the parameter of the second field device with the one or more attributes of the parameter from the identified one or more parameters of the first field device is based on the identified relationships between the plurality of commands and the one or more parameters of the first field device.

9. The method as claimed in claim 8, wherein the one or more attributes of the parameter of the second field device includes one or more commands associated with the parameter of the second field device.

10. A configuration tool for replacing a first field device with a second field device in a plant, the configuration tool comprising:
    a network interface configured to receive a device description file associated with the first field device, the device description file comprising a plurality of parameters, and to transmit a configuration file to the second field device for commissioning operation of the second field device in accordance with the configuration file;
    a memory module, wherein the memory module comprises a semantic dictionary; and
    one or more processors configured to:
       analyze the device description file, wherein analyzing the device description file comprises identifying one or more parameters from the plurality of parameters for mapping based on a predetermined criteria,
       generate a first object by mapping a parameter of the second field device to a parameter from the identified one or more parameters of the first field device using a seed profile, and
       generate the configuration file associated with the second field device based on the device description file and the generated first object.

11. The configuration tool as claimed in claim 10, wherein the seed profile includes one or more associations between Highway Addressable Remote Transducer (HART) specified parameters and parameters of the first field device.

12. The configuration tool as claimed in claim 10, wherein the one or more processors are further configured to request a confirmation from a user upon mapping the parameter of the second field device to the parameter from the identified one or more parameters, and to modify the semantic dictionary upon receiving confirmation from the user.

* * * * *